United States Patent [19]

Iwai et al.

[11] B 3,914,033
[45] Oct. 21, 1975

[54] APPARATUS FOR PHOTOGRAPHING ANIMATION FILMS

[75] Inventors: Yoshihiro Iwai, Tokyo; Kunihiko Tanaka, Takamatsu, both of Japan

[73] Assignee: Nippon Hoso Kyokai, Tokyo, Japan

[22] Filed: Apr. 9, 1973

[21] Appl. No.: 349,177

[44] Published under the Trial Voluntary Protest Program on January 28, 1975 as document no. B 349,177.

[30] Foreign Application Priority Data

Apr. 20, 1972   Japan.............................. 47-39096

[52] U.S. Cl................... 352/87; 352/169; 352/178; 352/179
[51] Int. Cl........................................... G03B 21/32
[58] Field of Search ....... 352/50, 87, 169, 178, 179; 95/31 EL; 354/204

[56] References Cited
UNITED STATES PATENTS

| | | | |
|---|---|---|---|
| 3,183,770 | 5/1965 | Nyman, Jr. et al. ................. | 352/87 |
| 3,190,955 | 6/1965 | Maurer................................ | 352/87 |
| 3,415,600 | 12/1968 | Yarbrough........................... | 352/87 |
| 3,690,752 | 9/1972 | Derossi ................................ | 352/169 |

*Primary Examiner*—Samuel S. Matthews
*Assistant Examiner*—Russell E. Adams, Jr.
*Attorney, Agent, or Firm*—Stevens, Davis, Miller & Mosher

[57] ABSTRACT

An apparatus for photographing animation films including a drive mechanism which drives a main shaft of a cinecamera. The drive mechanism has a rotating drive shaft which is rotating at a constant speed in either a normal or a reverse direction. An apertured disc and ratchet wheels are mounted on a rotatable shaft which drivingly connects the rotating shaft to the main shaft. A light detector receives light from a light source when the aperture in the disc passes a certain point in its revolution about the rotatable shaft to detect the revolution number of the rotatable shaft. A circuit compares the output of the detector with a preselected value to control further rotational movement of the main shaft of the cinecamera, including stopping of rotation by urging ratchets against the ratchet wheels.

13 Claims, 5 Drawing Figures

FIG_1
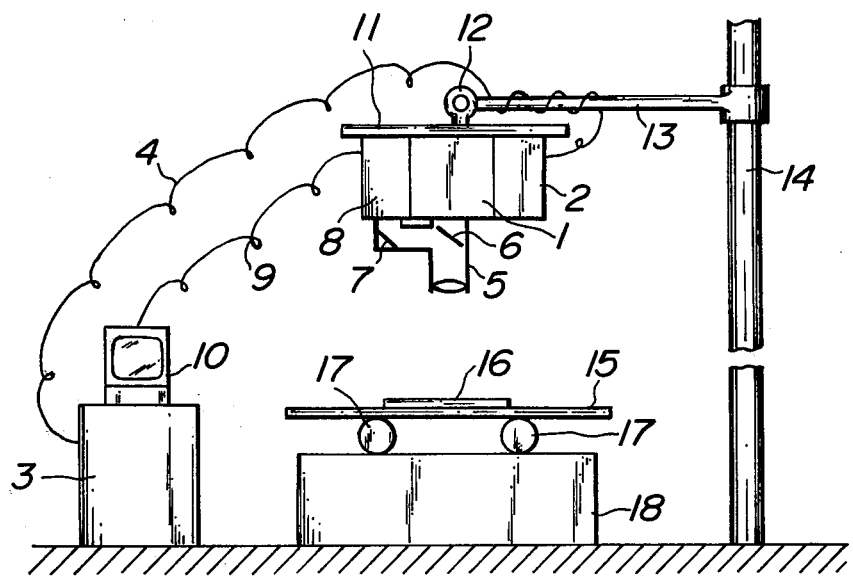
FIG_2
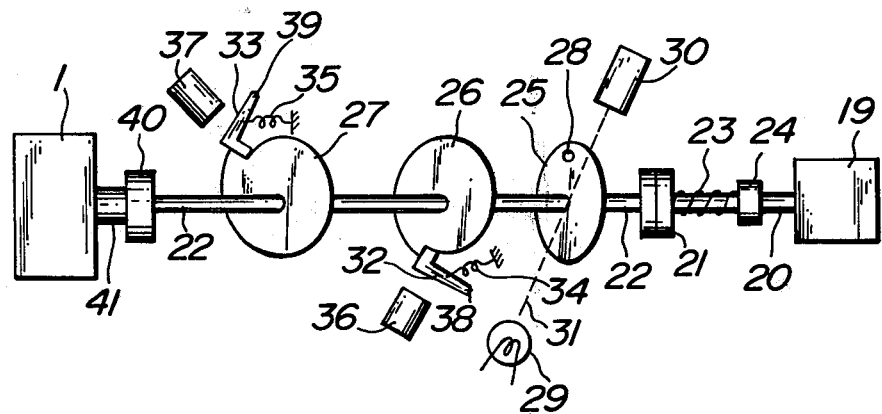

FIG_3
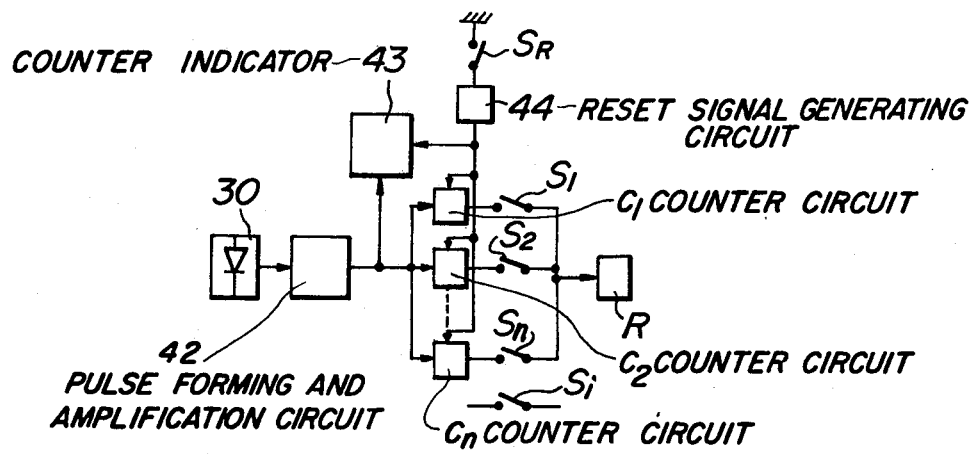
FIG_4
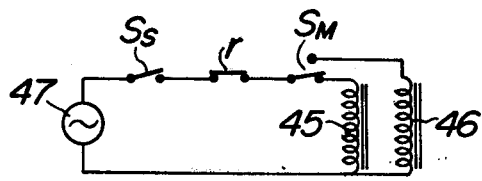
FIG_5
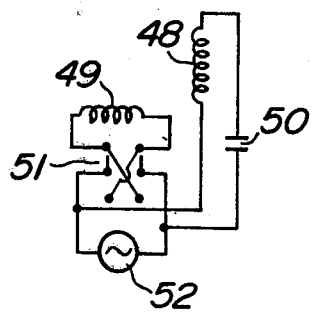

APPARATUS FOR PHOTOGRAPHING ANIMATION FILMS

BACKGROUND OF THE INVENTION

1. Field of the Invention

The present invention relates to an apparatus for photographing animation films.

2. Description of the Prior Art

In order to enable the animated movements of inanimate things in pictures, there have been suggested apparatuses for photographing animation films capable of exposing frames of a film one by one to perform so-called single frame photographing and exposing a number of frames continuously at a rate of at the best four frames per second. However, as long as the number of frames per second to be exposed in the continuous photographing remains at such a low level, the prior art apparatuses are not adequate to meet the animation photographing and continuous photographing at a rate of, for example, 24 frames per second which is usual in cinecameras.

There has also been proposed a small-type portable camera capable of exposing frames of a film one by one and adapted to be able to expose a number of frames continuously. This portable camera, however, is provided with a relatively simplified driving mechanism with a spring as a driving power source so that a shutter speed in photographing of a single frame of a film is inherently different from that in continuous photographing of a number of frames with the result that there are differences in exposure between the portions of the film corresponding to the both photographings to provide an inharmoniousness in pictures. With such a prior art apparatus, particularly, remarkable fluctuation in exposure may take place at the initial portion of a film where the continuous photographing is started.

SUMMARY OF THE INVENTION

The present invention overcomes the foregoing disadvantages in the prior art and comprises a cinecamera having a main shaft upon every rotation through a determined angle of which, frames of a film are photographed and fed one by one, torque producing means rotatable in normal and reverse direction at a constant speed corresponding to the feeding speed of the frames in the order of 24 frames per second, a rotating shaft having one end coupled through a friction disc to a rotating shaft of said torque producing means, rotating speed detecting means associated with said first mentioned rotating shaft, restraint means fixed to the shaft for restraining the rotation of the shaft, a coupling for connecting the other end of said first mentioned shaft to said main shaft of said cinecamera, a coincidence circuit comparing the output of said detecting means with a preselected value to provide coincidence information, means for stopping the stepwise rotation of said restraint means in response to the output of said coincidence circuit, a television camera adapted to receive an incident luminous flux which is divided at a luminous flux divider interposed in the optical system of said cinecamera and a monitor for monitoring the output from said television camera.

A primary object of the invention is, therefore, to provide an apparatus for photographing animation films which is capable of exposing frames of a film one by one and continuously exposing a number of frames at a high frame feeding speed which is usual in cinecameras, and adapted to be able to perform single frame and continuous photographings with the same shutter speed.

A further object of the invention is to provide an apparatus for photographing animation films which is capable of preselecting the number of frames to be photographed to stop automatically the operation of the apparatus immediately after the frames of a determined number have been exposed.

An other object of the invention is to provide an apparatus for photographing animation films which is provided with a viewfinder arranged at a location remote from the cinecamera body and adapted to be able to remotely control the start, stop and the other operation of the apparatus.

BRIEF DESCRIPTION OF THE DRAWING

The foregoing objects and other objects as well as the characteristic features of the invention will become more apparent and more readily understandable by the following description and the appended claims when read in conjunction with the accompanying drawings, in which:

FIG. 1 is a schematic front elevation of one embodiment of the apparatus for photographing animation films according to the invention;

FIG. 2 is a schematic elevation of one embodiment of drive mechanism for use with the apparatus according to the invention;

FIG. 3 shows one embodiment of a circuit for controlling a number of frames of a film to be photographed for use with the apparatus according to the invention;

FIG. 4 shows one embodiment of a circuit for stopping a driving shaft of a cinecamera for use with the apparatus according to the invention; and FIG. 5 shows one embodiment of a circuit for reversing the rotation of the drive mechanism shown in FIG. 2.

DESCRIPTION OF THE PREFERRED EMBODIMENTS

Referring to FIG. 1 diagrammatically showing one embodiment of an apparatus for photographing animation films according to the invention, the apparatus comprises a cinecamera body 1 similar to a conventional one and a drive mechanism 2 for driving a film transfer mechanism and a shutter mechanism in the camera body 1, the drive mechanism 2 being connected to a control operation and power source 3 through a lead wire 4. A part of luminous flux incident into an optical system 5 of the cinecamera body 1 from an article to be photographed is reflected at a half mirror 6 and again at a reflector 7 to be led into a television camera 8. Video signals from the television camera 8 are transmitted through a wire 9 to a television monitor 10. The cinecamera body 1, drive mechanism 2 and camera 8 are fixed to a base plate 11 carried through an articulate connection 12 by an arm 13 which is adjustable in height along a column 14. The article 16 to be photographed is seated on a base 15 which is movable with the aid of rollers 17 driven by a roller drive 18.

FIG. 2 illustrates a schematic arrangement of the drive mechanism 2 shown in FIG. 1, which comprises a torque producing means 19 including a synchronous motor or pulse motor and others having an output shaft 20 which is provided with a stopper 24 supporting one end of a spring 23 which serves to adjust urging force of a friction disc 21 for transmitting the torque produced in the means 19 to a rotating shaft 22 having a revolution number detecting disc 25 and ratchet wheels 26 and 27 fixed thereto for controlling the rotation of the shaft 22 in normal and reverse direction. The detecting disc 25 is formed with an aperture 28 through which a light detector 30 receives light to detect the revolution number of the shaft 22 at a moment when the aperture 28 becomes coincident with an aligned line 31 of a light source 29 and the detector 30. The ratchet wheels 26 and 27 are respectively provided with ratchets 32 and 33 pivotally movable about pivots 38 and 39. The ratchets 32 and 33 are engaged with the ratchet wheels 26 and 27 to restrain the shaft 22 against rotation in any direction and disengaged from the wheels to permit the wheels to rotate in any desired direction when any one of magnets 36, 37 is energized for transmitting the torque of the shaft 20 to the shaft 22 through the friction disc 21. When the magnets are de-energized, the ratchets 32, 33 are urged against and engaged with the wheels 26, 27 by means of springs 34, 35, respectively, to restrain the rotation of the shaft 22 as shown in FIG. 2. In this condition, the friction disc 21 is slipping so that the torque is not transmitted from the shaft 20 to the shaft 22. It can be seen from FIG. 2 that the relative position of the aperture 28 of the disc 25 to the detector 30 are so arranged that the aperture 28 is not in registry with the line 31 connecting the light source 29 to the detector 30 when the shaft 22 is in stationary position. The members and units designated by 19-39 constitute the drive mechanism 2 as a whole. The rotating shaft 22 is connected to a main shaft 41 of the cinecamera body 1 through a connection means 40 which may be conventional coupling for securely connecting two shafts or may preferably be such a coupling having shock absorption faculty in order to avoid abrupt start and stop of the main shaft 41 to some extent.

In the embodiment shown in FIG. 2, while the shaft 22 rotates one revolution, the main shaft 41 of the cinecamera body 1 also rotates one revolution during which a shutter is opened one time and one frame of a film is transferred. The torque producing means 19 is normally maintained in operative condition in normal or reverse direction and the shaft 20 is rotated at a constant speed so that the main shaft 41 of the cinecamera body 1 is driven at the moment when the magnet 36 or 37 is energized, and the shutter speed has reached determined value at the moment when an opening of the shutter disc arrives at a position immediately above the film. Accordingly, even the first frame of a film at the commencement of the photographing will be exposed to a determined amount of light and hence any frame of the film will be exposed to the determined amount of light in the event that single frame or discontinuous and continuous photographings are performed by switching over them at will so that any discontinuity in quality of picture will never take place.

If the ratchet wheel 26 or 27 is provided with $n$ ratchet teeth spaced at equal intervals about the periphery of the wheel and the detecting disc 25 is formed with $n$ apertures 28 angularly spaced at equal interval, one revolution of the shaft 22 corresponds to the displacement of $n$ frames of the film. In this case, however, it is necessary to use a cinecamera which performs the photographing and transferring of one frame during $1/n$ revolution of the main shaft 41. The revolution number detecting means may be constructed in various types other than the above photoelectric means, such as for example, with electromagnetic means consisting of a magnet and a coil.

FIGS. 3-5 illustrate one embodiment of the control operation and power source 3 shown in FIG. 1. Referring to FIG. 3 a circuit for controlling the number of frames to be photographed is shown in which the light detecting means 30 includes a photodiode as a main element and produces a pulse output representative of the revolution number of the main shaft 41 or the number of frames to be photographed, which is fed to a pulse forming and amplification circuit 42 in which the pulse output from the light detecting means 30 is transformed into a pulse signal appropriate in size and waveform which is then supplied to respective counter circuits $C_1, C_2, \ldots, C_n$. The counter circuit $C_1$ receives a pulse signal input to generate a DC output to generate a DC output and the counter circuit $C_2$ receives two pulse signal inputs to generate a DC output. In this manner, the counter circuit $C_n$ receives n pulse signal inputs to produce a DC output. Each of the outputs from the counter circuits is selected at will by any one of switches $S_1, S_2, \ldots, S_n$ so as to be supplied to an exciting coil (not shown) of a relay R. The counter circuits $C_1, C_2, \ldots, c_n$ and switches $S_1, S_2, \ldots, S_n$ therefore constitute a coincidence circuit for generating an output to energize the exciting coil of the relay R when the number of the pulses from the pulse forming and amplification circuit 42 is coincident with the number of inputs which any one of the counter circuits can receive, that is the number of frames. The switches $S_1, S_2, \ldots, S_n$ are interlocked with each other so that when any one of the switches is turned on, all of the other switches are automatically turned off. A counter indicator 43 shown in FIG. 3 is adapted to count the pulse signal output from the pulse forming and amplification circuit 42 to indicate the number of photographed frames and a reset signal generating circuit 44 is adapted to produce reset signals which are fed to the counter circuit $C_1, C_2, \ldots, C_n$ with the aid of a trigger switch $S_R$.

FIG. 4 illustrates a circuit for energizing exciting coils 45, 46 of the electromagnets 36, 37 to stop the rotation of the ratchet wheels 26, 27. The circuit comprises a DC source or AC source 47, a starting switch $S_S$ a break contact r for the relay R and a single-pole double throw switch $S_M$ which is interlocked with a switch 51 described hereinafter and serves to close the circuit for the coil 45 of the electromagnet 36 for the normal rotation of the shaft 22 or the circuit for the coil 46 of the electromagnet 37 for the reverse rotation of the shaft 22.

FIG. 5 shows a circuit for reversing the direction of rotation of the shaft in case of using a synchronous motor in the torque producing means 19. The circuit comprises field coils 48, 49, a phase advancing condenser 50, a two-pole double throw switch 51 and a single phase AC source 52. The reversal of a motor is accomplished by switching over the switch 51. The control operation and power source 3 is preferably made in the form of a control panel on which an indicator dial of the counter indicator 43 and the switches $S_1$-$S_n$, $S_l$, $S_B$, $S_S$, 51 and the like are arranged for convenience in operation. The monitor 10 is also preferably mounted on a turntable carried on the control panel.

The operation of the circuits for use with the apparatus according to the invention will concretely be explained in detail hereinafter referring to FIGS. 2-5.

The switch 51 is turned on one side in which the shaft 22 is rotated in normal direction, for example, on the upper side as viewed in FIG. 5 so that the output shaft 20 of the torque producing means 19 rotates at a constant speed in the normal direction. In this case, if the starting switch $S_S$ is opened as shown in FIG. 4, the electromagnets 36, 37 are deenergized and the ratchets 26, 27 are in lock or engaged position by the action of the springs 34, 35. In this condition, the torque of the output shaft 20 is not transmitted to the rotating shaft 22 so that the cinecamera 1 including a film therein is in rest condition and the shutter is of course closed. The starting switch $S_S$ is then closed to flow current through the exciting coil 45 of the electromagnet 36 for the normal rotation of the shaft 22 because the switch $S_M$ interlocked with the switch 51 has been closed for the coil 45. As a result, the electromagnet 36 is energized to attract the trigger or ratchet 32 to the magnet, permitting the ratchet wheel 26 to rotate in the normal direction to transmit the torque of the shaft 20 to the rotating shaft 22 through the friction disc 21. The rotation of the shaft 22 is transmitted to the main shaft 41 of the cinecamera body 1 to start the rotation of the shutter disc (not shown) in the cinecamera body 1 such that the opening of the shutter disc passes over a frame of a stationary film at a constant speed to perform the exposure of the film. After the exposure has been completed, the film is moved a distance corresponding to one frame and stopped. The above sequential operations are carried out during one revolution of the rotating shaft 22. On the other hand, at the moment when the aperture 28 formed in the revolution number detecting disc 25 becomes coincident with the aligned line 31, the light from the light source 29 is projected onto the light detector 30 so that the pulse forming and amplification circuit 42 shown in FIG. 3 produces one pulse signal.

Assuming that the switch $S_1$ in FIG. 3 has been closed, the DC output derived from the counter circuit $C_1$ having received the one pulse signal serves to energize the relay R and hence to open the break contact r, permitting the electromagnet 36 to be deenergized as clearly shown in FIG. 4, so that the trigger or ratchet 32 engages the ratchet tooth of the ratchet wheel 26 to stop the rotation of the rotating shaft 22. Assuming that the switch $S_n$ has been closed, immediately before the rotating shaft 22 has rotated n revolution the light detector 30 produces a nth pulse signal, and at that moment the DC output derived from the counter circuit $C_n$ passes through the switch $S_n$ to the relay R and makes it effective, permitting the electromagnet 36 to be deenergized to stop the rotation of the shaft 22. If the switch $S_l$ is closed, all of the switches $S_1$-$S_n$ other than $S_l$ are opened, so that the relay R will never operate and therefore as long as the starting switch $S_l$ is maintained closed the rotating shaft 22 continues its rotation, during which the apparatus performs the continuous photographing.

If the rotating shaft 22 is to rotate in the reverse direction, the switch 51 is turned on the lower side as viewed in FIG. 5 and simultaneously the switch $S_M$ interlocked with the switch 51 is turned on the upper side as viewed in FIG. 4 to rotate the torque producing means 19 in the reverse direction. In this case the operation of the apparatus is similar to that in the normal rotation with the exception that the ratchet wheel 27, trigger or ratchet 33, electromagnet 37 and exciting coil 46 are used. Every time when the photographing of desired number of frames of a film has been completed, the reset triggering switch $S_R$ in FIG. 3 is turned on and off one time to reset the respective counter circuit $C_1, C_2, \ldots, C_n$ and the counter indicator 43.

In the above description, the torque producing means 19 is rotated at the constant speed or such a speed that a film will be transferred a distance corresponding to the overall length of 24 frames. However, the apparatus according to the invention is not limited to such an arrangement. The torque producing means 19 may be, for example, variable and for this purpose a pulse motor may be utilized and operated by power source of various pulse periods which are selectively switch over by an operator. Moreover, the count indicator 43 as shown in FIG. 3 may be so constructed that addition and subtraction can be selectively performed only by operation of a selector switch.

As can be seen in the above description, the apparatus for photographing animation films according to the invention gives an equal amount of exposure to all frames regardless of single frame or continuous photographing so that any inharmoniousness in gradation does not take place on the frames. Therefore, animations of stationary pictures photographed one by one and moving pictures continuously photographed are merged with each other in harmony. The apparatus according to the invention can preselect the number of frames to be photographed so that the same stationary pictures on a plurality of frames are photographed by a single operation with high efficiency. The number of frames to be photographed can be visibly indicated in the counter indicator and also calculation of the number of frames in a reverse rotation can be easily carried out by the use of a counter indicator capable of performing the addition as well as subtraction. In the apparatus according to the invention, furthermore, a viewfinder of the camera consists of a television camera and a monitor to make it possible to locate the cinecamera body at a remote position and to confirm a picture construction at the monitor at hand so that positioning of pictures in photographing can be effected with ease and accuracy. If the position of a certain part in the preceding scene is recorded on the screen of the monitor, the relative position of a new scene to the preceding scene will become so clear that a composite photographing and the like can be carried out very easily and accurately.

The apparatus for photographing animation films according to the invention, therefore, can produce animation films of good quality with high efficiency having the portions that moving pictures continuously photographed are inserted between the animations of the stationary pictures or overlapped onto the stationary pictures photographed one by one and can perform accurate and flexible panning and zooming with ease and high efficiency by the operation of lenses or a base for articles to be photographed in consequence of the continuously photographing faculty. The apparatus according to the invention has the above various advantages which are very effective in practice.

While several examples have been disclosed herein, it is obvious that various changes can be made without departing from the spirit and scope of the invention as set forth in the appended claims.

What is claimed is:

1. An apparatus for photographing animation films comprising:
   a cinecamera having an optical system and a main shaft upon every rotation of which through a predetermined angle, frames of a film are photographed and fed one by one,
   torque producing means having an output shaft selectively rotatable in a normal or a reverse direction at a constant speed corresponding to the speed at which the frames are fed,
   a rotatable shaft having first and second ends,
   friction disc clutch means coupling the first end of said rotatable shaft to said output shaft,
   rotational speed detecting means operatively connected to said rotatable shaft for detecting a revolution number of said rotatable shaft and for producing an output proportional to the number of frames fed per unit of time,
   restraint means coupled to the rotatable shaft for selectively starting and stopping the rotation of the rotatable shaft,
   a coupling for connecting the second end of said rotatable shaft to said cinecamera,
   a coincidence circuit connected to said detecting means for comparing the output of said detecting means with a preselected value to provide a coincidence output,
   means for controlling said restraint means in response to the output of said coincidence circuit to start rotation of said rotatable shaft and to stop rotation after said rotatable shaft has rotated through said perdetermined angle.
   a television camera,
   a luminous flux divider interposed in the optical system of said cinecamera for directing a portion of the light from said optical system to said television camera,
   said television camera adapted to receive an incident luminous flux which is divided at said luminous flux divider interposed in the optical system of said cinecamera,
   and a mointor for monitoring the output from said television camera.

2. An apparatus for photographing animation films as set forth in claim 1, said torque producing means comprises a synchronous motor.

3. An apparatus for photographing animation films as set forth in claim 1, said torque producing means comprises a pulse motor.

4. An apparatus for photographing animation films as set forth in claim 1, said friction disc clutch means (21) is provided with a spring (23) and a stopper (24) for adjusting the clutching action of said friction disc clutch means, 5. An apparatus for photographing animation films as set forth in claim 1, said rotational speed detecting means comprises a detecting disc (25) fixed to said rotatable shaft (22) and formed with an aperture (28), a light source (29) and a light detector (30) which receives light from said light source only when said aperture (28) becomes aligned with the light source (29) and the detector (30).

6. An apparatus for photographing animation films as set forth in claim 5, said light detector comprises photoelectric means.

7. An apparatus for photographing animation films as set forth in claim 5, said light detector comprises electromagnetic means consisting of a magnet and a coil.

8. An apparatus for photographing animation films as set forth in claim 1, said restraint means comprises first and second ratchet wheels (26,27) each fixed to said rotatable shaft (22), first and second pivotable ratchets 32,33 respectively normally engaging said ratchet wheels for restraining the rotation of the rotatable shaft (22) and first and second electromagnets (36,37) respectively operatively connected to said first and second ratchets for disengaging said ratchets from said ratchet wheels when energized, permitting the rotatable shaft (22) to rotate.

9. An apparatus for photographing animation films as set forth in claim 1, said rotational speed detecting means comprises a revolution number detecting disc fixed to said rotatable shaft (22) and formed with an interger number of apertures angularly spaced at equal intervals around said disc, a light source (29) and a light detector (30) which receives light from said light source only when one of said apertures become aligned with the light source (29) and the detector (30), and said restraint means comprises first and second ratchet wheels each provided with an integer number of ratchet teeth spaced at equal intervals about the periphery of the wheels and each fixed to said rotatable shaft (22), first and second pivotable ratchets (32,33) respectively normally engaging said ratchet wheels for restraining the rotation of the rotatable shaft (22), and first and second electromagnets (36,37) respectively operatively connected to said first and second ratchets for disengaging said ratchets from said ratchet wheels when energized to thereby permit the rotatable shaft (22) to rotate.

10. An apparatus for photographing animation films as set forth in claim 1, said coupling for connecting the rotatable shaft (22) to said main shaft (41) of the cinecamera is provided with a shock absorption portion to avoid abrupt start and stop of the main shaft (41).

11. An apparatus for photographing animation films as set forth in claim 1, said coincidence circuit comprises a pulse forming and amplification circuit (42) for receiving the output from the rotational speed detecting means representative of the number of frames to be photographed to transform the output into a pulse signal appropriate in size and waveform, a plurality of counter circuits ($C_1, C_2, \ldots, C_n$) connected to said pulse forming and amplification circuit for receiving an integer number of pulse signal inputs from said pulse forming and amplification circuit (42) to produce a DC output, a plurality of switches ($S_1, S_2, \ldots, S_n$) for selecting any one of said circuits ($C_1, C_2, \ldots, C_n$) and a relay having an exciting coil, said switches ($S_1, S_2, \ldots, S_n$) being interlocked with each other so that when any one of the switches is turned on, all of the other switches are automatically turned off.

12. An apparatus for photographing animation films as set forth in claim 11, said coincidence circuit further comprises a trigger switch and a counter indicator (43) adapted to count the pulse signal from the pulse forming and amplification circuit to indicate the number of photographed frames and a reset signal generating circuit (44) adapted to produce reset signals which are fed to the counter circuits ($C_1, C_2, \ldots, C_n$) with the aid of said trigger switch ($S_R$).

13. An apparatus for photographing animation films as set forth in claim 9, further comprises a circuit for energizing exciting coils (45, 46) of the first and second electromagnets (36, 37) to stop the rotation of the first and second ratchet wheels (26, 27), said circuit comprising a power source (47), a starting switch $S_S$), a relay, a break contact (r) for the relay (R) and a single-pole double throw switch ($S_M$), and further comprises a circuit for reversing the rotation of said torque producing means, said torque producing means comprising a synchronous motor, said reversing circuit comprising field coils (48, 49), a phase advancing condenser (50), a two-pole double throw switch (51) interlocked with said single-pole double throw switch ($S_M$) and a single phase AC source (52).

\* \* \* \* \*